(12) United States Patent
Shimakawa

(10) Patent No.: US 11,914,194 B2
(45) Date of Patent: Feb. 27, 2024

(54) OPTICAL CONNECTION STRUCTURE

(71) Applicant: SUMITOMO ELECTRIC INDUSTRIES, LTD., Osaka (JP)

(72) Inventor: Osamu Shimakawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/827,401

(22) Filed: May 27, 2022

(65) Prior Publication Data

US 2022/0390683 A1  Dec. 8, 2022

(30) Foreign Application Priority Data

Jun. 7, 2021 (JP) ................................. 2021-094989

(51) Int. Cl.
*G02B 6/38* (2006.01)
*G02B 6/40* (2006.01)

(52) U.S. Cl.
CPC ........... *G02B 6/382* (2013.01); *G02B 6/3861* (2013.01); *G02B 6/3863* (2013.01); *G02B 6/403* (2013.01)

(58) Field of Classification Search
CPC .. G02B 6/3833; G02B 6/3034; G02B 6/3861; G02B 6/4239
See application file for complete search history.

(56) References Cited

U.S. PATENT DOCUMENTS

| | | | |
|---|---|---|---|
| 9,599,776 B2 | 3/2017 | Shimakawa | |
| 2020/0341207 A1* | 10/2020 | Nakama | G02B 6/3847 |
| 2021/0132299 A1* | 5/2021 | Nakama | B08B 7/0028 |
| 2022/0137303 A1* | 5/2022 | Otomitsu | G02B 6/3882 |
| | | | 385/78 |

FOREIGN PATENT DOCUMENTS

| | | |
|---|---|---|
| JP | H01-136904 A | 5/1989 |
| JP | H01-262507 A | 10/1989 |
| JP | 2019-113597 A | 7/2019 |
| WO | WO-2019244388 A1 * | 12/2019 |

* cited by examiner

*Primary Examiner* — Eric Wong
(74) *Attorney, Agent, or Firm* — Oliff PLC

(57) ABSTRACT

An optical connection structure includes a MCF, a first ferrule, a plurality of optical fibers, and a second ferrule. The MCF includes first cores and a first cladding. The first ferrule has a first inner hole and a first ferrule end surface. Each optical fiber optically connected to the MCF includes a second core and a second cladding. The second ferrule has a second inner hole housing tip parts of the optical fibers, and a second ferrule end surface. The second ferrule fixes the tip parts of the optical fibers in the second inner hole by an adhesive. The adhesive is packed in the second inner hole such that a surface of the adhesive is recessed from the second ferrule end surface into the second inner hole. A refractive-index matching material is applied in a space sealed by the first ferrule end surface and the second ferrule end surface.

15 Claims, 14 Drawing Sheets

OPTICAL CONNECTION STRUCTURE

CROSS REFERENCE TO RELATED APPLICATIONS

This application claims the benefit of priority based on Japanese Patent Application No. 2021-094989 filed on Jun. 7, 2021, and the entire contents of the Japanese patent application are incorporated herein by reference.

TECHNICAL FIELD

The present disclosure relates to an optical connection structure.

BACKGROUND

JP2019-113597A discloses an optical connection structure to optically connect a multi-core fiber to a plurality of optical fibers. In this optical connection structure, a tip surface of the multi-core fiber housed in a ferrule and each of a tip surface of the plurality of optical fibers housed in another ferrule are butted against each other to optically connect both fibers. (Also refer to the following references, U.S. Pat. No. 9,599,776B, JP H01-262507A, and JP H01-136904.)

SUMMARY

The present disclosure provides an optical connection structure. The optical connection structure includes a multi-core fiber, a first ferrule, a plurality of optical fibers, and a second ferrule. The multi-core fiber includes a plurality of first cores that extend in a longitudinal direction, a first cladding that surrounds the plurality of first cores, and a first fiber tip surface that includes tips of the plurality of first cores and a tip of the first cladding. The ferrule has a first inner hole that houses a tip part of the multi-core fiber, and a first ferrule end surface. The first fiber tip surface is exposed in the inner part of the first ferrule end surface. The first ferrule fixes the tip part of the multi-core fiber in the first inner hole. The plurality of optical fibers are optically connected to the multi-core fiber. Each of the plurality of optical fibers includes a second core that extends in the longitudinal direction, a second cladding that surrounds the second core, and a second fiber tip surface that includes a tip of the second core and a tip of the second cladding. The second ferrule has a second inner hole that houses tip parts of the plurality of optical fibers, and a second ferrule end surface. The second fiber tip surface of each of the plurality of optical fibers is exposed in the inner part of the second ferrule end surface. The second ferrule fixes the tip parts of the plurality of optical fibers in the second inner hole with an adhesive. The adhesive is packed in the second inner hole such that a surface of the adhesive facing the first fiber tip surface is recessed from the second ferrule end surface into the second inner hole. A refractive-index matching material is applied in a space sealed by the first ferrule end surface and the second ferrule end surface.

DETAILED DESCRIPTION

Figure 14:
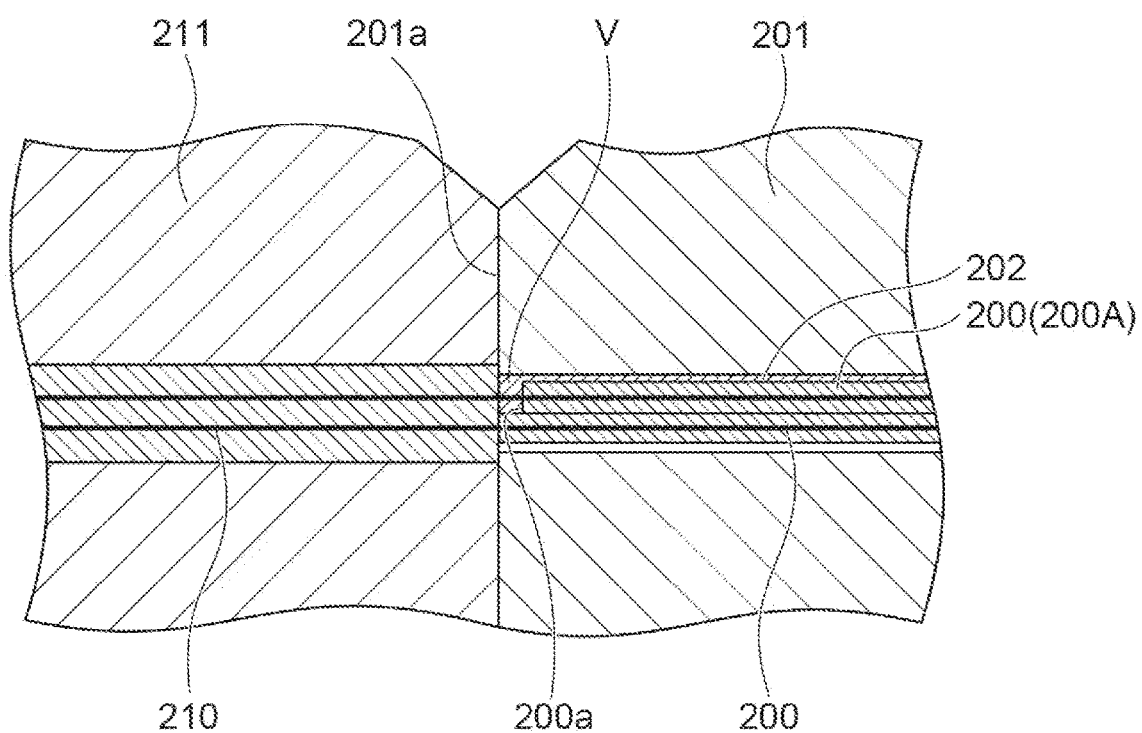
FIG. 14 is a cross-sectional view illustrating a state in which an optical fiber is recessed in an optical connection structure.

As illustrated in FIG. 14, a plurality of optical fibers 200 are housed in a ferrule 201 such that tips 200a of optical fibers 200 are aligned with an end surface 201a of ferrule 201, and is fixed to ferrule 201 with an adhesive 202 packed around optical fibers 200, in an optical connection structure disclosed in JP2019-113597A and the like. A ferrule end surface 201a including tips of optical fibers 200 and a tip of adhesive 202 is formed to be flush with each other by polishing or the like. However, an optical fiber 200A among optical fibers 200 fixed with adhesive 202 to ferrule 201 can move (can be recessed) toward a rear end in a longitudinal direction due to a thermal influence or the like during continued use. When optical fiber 200A among optical fibers 200 is recessed backward from a state in which optical fibers 200 are butted against multi-core fiber 210 held by a ferrule 211, a gap V is formed between multi-core fiber 210 and the recessed optical fiber 200A. When gap V is formed, back reflections and insertion losses between multi-core fiber 210 and the recessed optical fibers 200A are degraded. Therefore, it is desired to provide an optical connection structure that suppresses deterioration of optical characteristics over time.

According to the present disclosure, it is possible to suppress deterioration of optical characteristics over time.

Description of Embodiments of the Present Disclosure

First, the contents of embodiments of the present disclosure will be listed and described. An optical connection structure according to an embodiment includes a multi-core fiber, a first ferrule, a plurality of optical fibers, and a second ferrule. The multi-core fiber includes a plurality of first cores that extend in a longitudinal direction, a first cladding that surrounds the plurality of first cores, and a first fiber tip surface that includes tips of the plurality of first cores and a tip of the first cladding. The first ferrule has a first inner hole that houses a tip part of the multi-core fiber, and a first ferrule end surface. The first fiber tip surface is exposed in the inner part of the first ferrule end surface. The first ferrule fixes the tip part of the multi-core fiber in the first inner hole. The plurality of optical fibers are optically connected to the multi-core fiber. Each of the plurality of optical fibers includes a second core that extends in the longitudinal direction, a second cladding that surrounds the second core, and a second fiber tip surface that includes a tip of the second core and a tip of the second cladding. The second ferrule has a second inner hole that houses tip parts of the plurality of optical fibers, and a second ferrule end surface. The second fiber tip surface of each of the plurality of optical fibers is exposed in the inner part of the second ferrule end surface. The second ferrule fixes the tip parts of the plurality of optical fibers in the second inner hole with an adhesive. The adhesive is packed in the second inner hole such that a surface of the adhesive facing the first fiber tip surface is recessed from the second ferrule end surface into the second inner hole. A refractive-index matching material is applied in a space sealed by the first ferrule end surface and the second ferrule end surface.

The optical connection structure is configured that the surface of the adhesive packed in the second ferrule that holds the plurality of optical fibers is recessed from the second ferrule end surface into the second inner hole. The refractive-index matching material is applied in the space sealed by the first ferrule end surface and the second ferrule end surface. According to this aspect, even when some of the plurality of optical fibers are recessed due to a thermal influence or the like on the optical connection structure, the refractive-index matching material moves into the gap and fills the gap. Therefore, the optical connection structure does not degrade back reflections and insertion losses between the multi-core fiber and the recessed optical fiber or fibers even when there is a thermal influence or the like, and can suppress degradation of optical characteristics over time.

In one embodiment, a maximum amount of recession from the second ferrule end surface to the surface of the adhesive in the longitudinal direction may be equal to or greater than 0.1 μm and equal to or less than 5 μm. According to this aspect, since a space in which the refractive-index matching material is applied is extremely small, even when some of the plurality of optical fibers are recessed due to a thermal influence, the refractive-index matching material immediately moves into such gap due to a capillary action, and fills the gap. Therefore, this optical connection structure can easily prevent the degradation of back reflections and insertion losses between the multi-core fiber and the recessed optical fiber or fibers, and can easily suppress the degradation of optical characteristics over time. The maximum amount of recession from the second ferrule end surface to the surface of the adhesive in the longitudinal direction may be 3 μm or less.

In one embodiment, the refractive-index matching material may be applied in the space defined by the first fiber tip surface, the second inner hole, the recessed surface of the adhesive, and a tip exposure part including the second fiber tip surface of each of the plurality of optical fibers. According to this aspect, even when some of the plurality of optical fibers are recessed due to a thermal influence on the optical connection structure, the refractive-index matching material disposed near the gap immediately moves into the gap, and fills the gap. Therefore, this optical connection structure can easily prevent the degradation of back reflection and insertion losses between the multi-core fiber and the recessed optical fiber or fibers, and can easily suppress the degradation of optical characteristics over time. Apart of the refractive-index matching material may be applied so as to be located between the first ferrule end surface of the first ferrule and the second ferrule end surface of the second ferrule.

In one embodiment, the refractive-index matching material may have a refractive index with which an amount of deviation is within 3% with respect to a refractive index of the second core. According to this aspect, it is possible to more reliably prevent the degradation of back reflections and insertion losses between the multi-core fiber and the recessed optical fiber or fibers, and it is possible to more reliably suppress the degradation of optical characteristics over time. The refractive-index matching material may have a viscosity of being equal to or greater than 1 mPa·s and equal to or less than 10000 mPa·s. The refractive-index matching material may have the viscosity of being equal to or less than 3000 mPa·s. The refractive-index matching material may include a transparent liquid.

In one embodiment, arrangement of the plurality of first cores in a plane direction along the first fiber tip surface may coincide with arrangement of each second core in a plane direction along the second fiber tip surface. According to this aspect, the optical connection between the multi-core fiber and the plurality of optical fibers can be further optimized. Each core of the multi-core fiber and each core of the plurality of optical fibers may be arranged so that all of them correspond to each other, or some of them may be arranged so that they do not correspond to each other. In addition, each core of the multi-core fiber and each core of the plurality of optical fibers may be rotationally adjusted so that these cores correspond to each other in arrangement.

In one embodiment, the first ferrule and the second ferrule may be pressed against each other by a pressing member to seal the first ferrule end surface and the second ferrule end surface to each other. According to this aspect, it is possible to maintain a state in which the refractive-index matching material is applied in the space defined by the first ferrule end surface and the second ferrule end surface, with a simple configuration.

In one embodiment, the first ferrule and the second ferrule may be bonded and fixed to each other to maintain a state in which the first ferrule end surface and the second ferrule end surface are in close contact with each other. According to this aspect, it is possible to maintain a state in which the refractive-index matching material is applied in the space defined by the first ferrule end surface and the second ferrule end surface, with a simple configuration.

In one embodiment, the optical connection structure according to any one of the above-described aspects may further include a sleeve that holds the first ferrule and the second ferrule from outside such that respective optical axes of the plurality of first cores and an optical axis of each second core are aligned with each other. The first ferrule and the second ferrule may be bonded and fixed to the sleeve to maintain a state in which the first ferrule end surface and the second ferrule end surface are in close contact with each other. According to this aspect, it is possible to maintain a state in which the refractive-index matching material is applied in the space defined by the first ferrule end surface and the second ferrule end surface, with a simple configuration.

In one embodiment, the first ferrule end surface and the second ferrule end surface each may have, in at least a portion, a spherical shape having a radius of curvature of equal to or greater than 1 mm and equal to or less than 50 mm According to this aspect, a tip of the first ferrule and a tip of the second ferrule are easily brought into close contact with each other when the first ferrule and the second ferrule are butted against each other. Therefore, it is possible to easily perform a direct bonding, for example, a physical contact (PC), between the tip surface of the multi-core fiber and the tip surfaces of the plurality of optical fibers.

In another aspect, the present disclosure relates to a method of manufacturing an optical connection structure having any of the above-described aspects. The manufacturing method includes a step of inserting each of the tip parts of the plurality of optical fibers into the second inner hole of the second ferrule and fixing the plurality of optical fibers to the second ferrule with the adhesive, a step of polishing, together with the second fiber tip surface, the second ferrule end surface of the second ferrule to which the plurality of optical fibers are fixed, and a step of providing, after the step of polishing, a heat treatment on a member including the adhesive. In this method of manufacturing the optical connection structure, the heat treatment causes the surface of the adhesive to be recessed from the second ferrule end surface into the second inner hole. According to this manufacturing method, it is possible to easily form the space in which the refractive-index matching material to be injected between the multi-core fiber and the plurality of optical fibers is disposed.

Details of Embodiments of the Present Disclosure

Specific examples of embodiments according to the present disclosure will be described below with reference to the drawings. The present invention is not limited to the following examples, and is defined by claims, and is intended to embrace all the modifications within the meaning and range of equivalency of the claims. In the description of the drawings, same or corresponding elements are denoted by same reference numerals and redundant descriptions thereof will be omitted.

Figure 1:
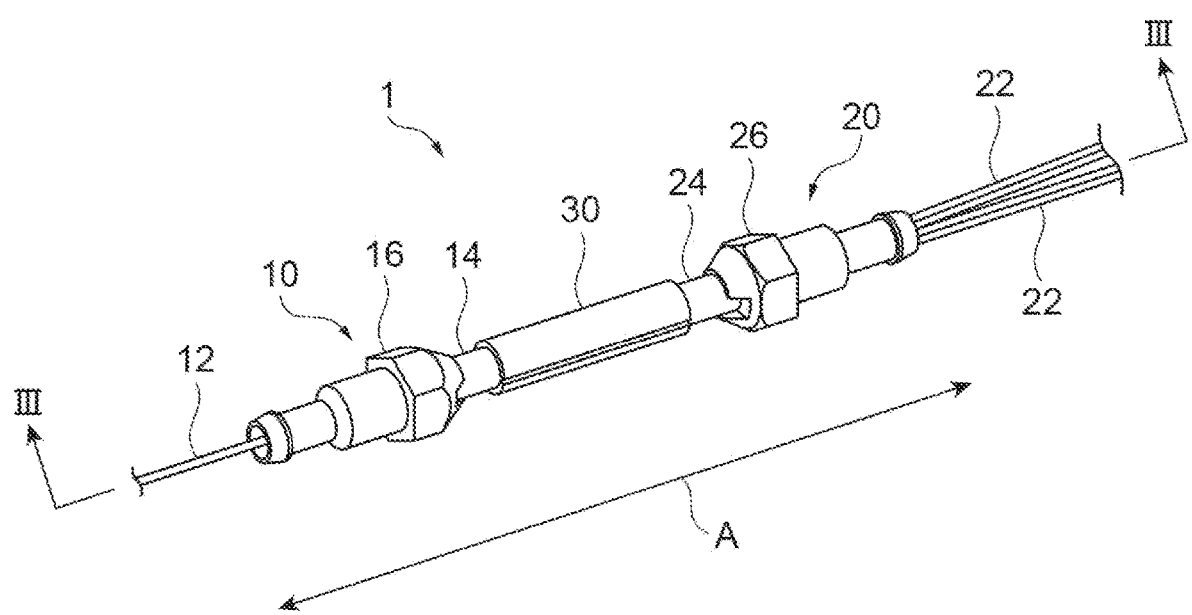
FIG. 1 is a perspective view illustrating an optical connection structure according to an embodiment.
Figure 2:
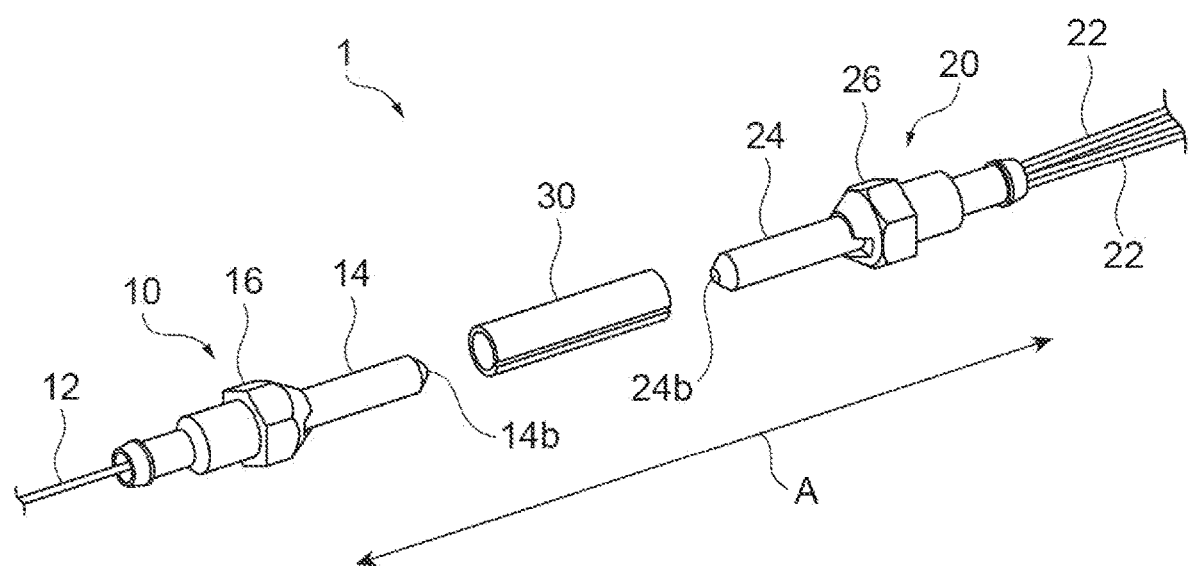
FIG. 2 is an exploded perspective view of the optical connection structure illustrated in FIG. 1.
Figure 3:
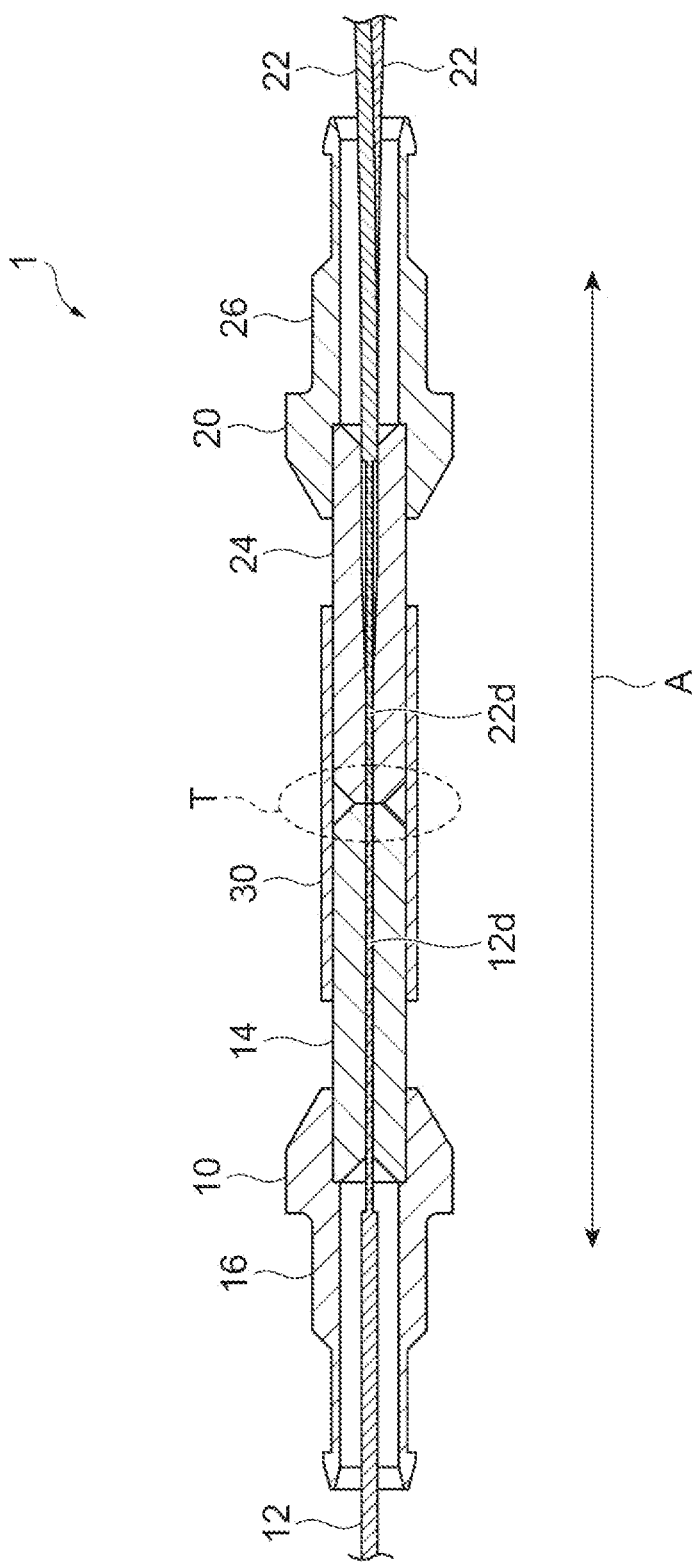
FIG. 3 is a cross-sectional view taken along line III-III of the optical connection structure illustrated in FIG. 1.

FIG. 1 is a perspective view illustrating an optical connection structure according to an embodiment. FIG. 2 is an exploded perspective view of the optical connection structure illustrated in FIG. 1. FIG. 3 is a cross-sectional view taken along line III-III of the optical connection structure illustrated in FIG. 1. As illustrated in FIGS. 1 to 3, an optical connection structure 1 includes a first optical connector 10, a second optical connector 20, and a split sleeve 30. First optical connector 10 includes a multi-core fiber 12 (hereinafter, also referred to as "MCF 12"), a ferrule 14, and a flange 16. Second optical connector 20 includes a plurality of optical fibers 22, a ferrule 24, and a flange 26. Split sleeve 30 holds ferrule 14 and ferrule 24 from outside such that respective optical axes of cores of MCF 12 in first optical connector 10 and an optical axis of each core of optical fibers 22 are aligned with each other (see also FIG. 4).

Figure 4:
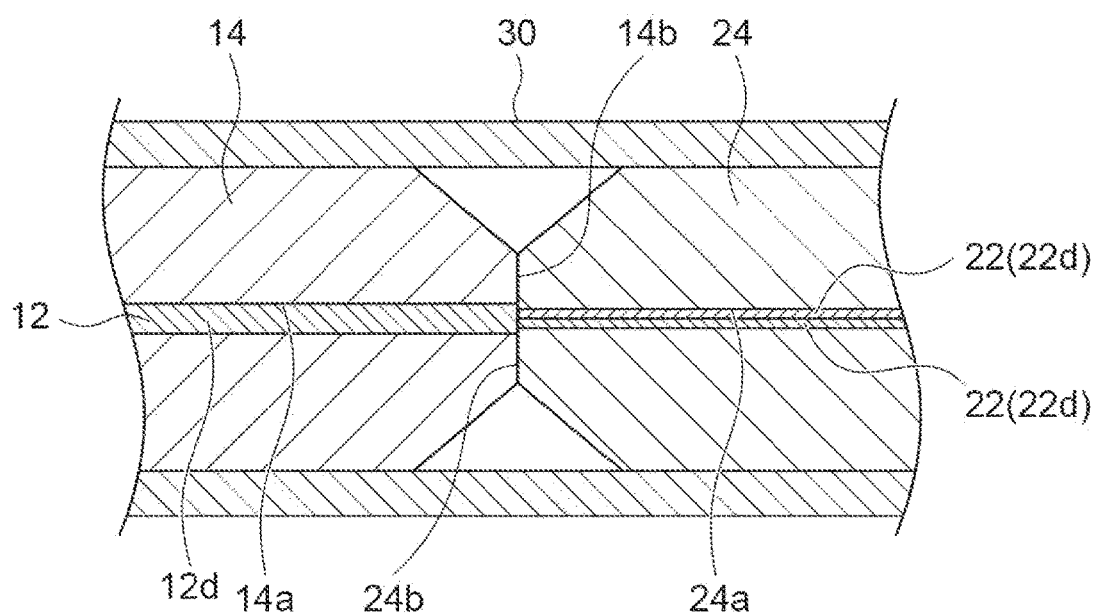
FIG. 4 is an enlarged cross-sectional view illustrating a region T of a part of the optical connection structure illustrated in FIG. 3.
Figure 5:
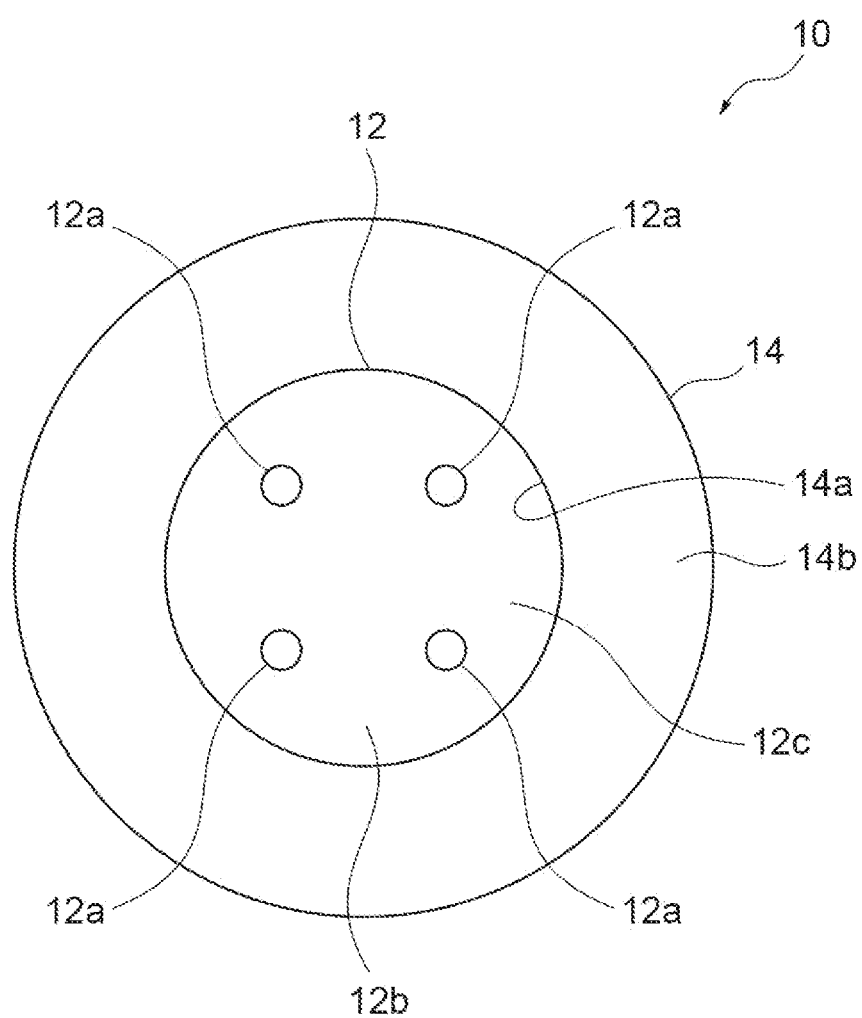
FIG. 5 is a diagram illustrating a tip of a multi-core fiber and an end surface of a ferrule.

As illustrated in FIGS. 3 to 5, MCF 12 includes a plurality of cores 12a that extends in a longitudinal direction A, a cladding 12b that extends in longitudinal direction A and that collectively surrounds the plurality of cores 12a, and a tip surface 12c. FIG. 4 is an enlarged cross-sectional view illustrating a region T of a part of optical connection structure 1. FIG. 5 is a diagram illustrating a tip of MCF 12 and an end surface of ferrule 14. Tip surface 12c is formed of tips of cores 12a and a tip of cladding 12b. Cores 12a may be made of silica glass in which a dopant such as germanium is added to increase a refractive-index. Cladding 12b may be made of silica glass in which a dopant such as fluorine is added to decrease a refractive-index. The combination of materials and dopants above can be appropriately selected. MCF 12 can propagate optical signals having predetermined wavelengths through cores 12a.

In MCF 12, for example, cores 12a are arranged two dimensionally. MCF 12 may include, for example, four cores 12a, as illustrated in FIG. 5, and may include seven cores 12a, eight cores 12a, or nineteen cores 12a. The number of cores 12a of MCF 12 is not limited thereto. In an example illustrated in FIG. 5, four cores 12a are arranged in a square configuration. A core diameter of each core 12a may be, for example, 10 µm or less, 5 µm or less, or 1 µm or more. A core pitch (center-to-center distance) of each core 12a may be, for example, 10 µm to 50 µm. A cladding diameter of cladding 12b may be, for example, 200 µm or less, 125 µm or less, 100 µm or less, 80 µm or less, or 50 µm or more.

Ferrule 14 is a columnar member that holds a tip part 12d of MCF 12, and has an inner hole 14a which is a through hole that houses tip part 12d of MCF 12, and an end surface 14b. Ferrule 14 fixes tip part 12d of MCF 12 in inner hole 14a so that tip surface 12c of MCF 12 is exposed in the inner part of end surface 14b. An inner diameter of inner hole 14a is the same as or slightly larger than an outer diameter of MCF 12. Tip part 12d of MCF 12 is inserted into inner hole 14a to be fitted. Ferrule 14 is, for example, 6 mm to 8 mm in length, and is made of a ceramic material such as zirconia.

As illustrated in FIG. 3, flange 16 is a cylindrical member that holds a rear end part of ferrule 14 and houses MCF 12 therein. A part of MCF 12 that housed in flange 16 may be fixed in flange 16 by an adhesive or the like. Flange 16 is made of, for example, a metal or a resin.

Figure 6:
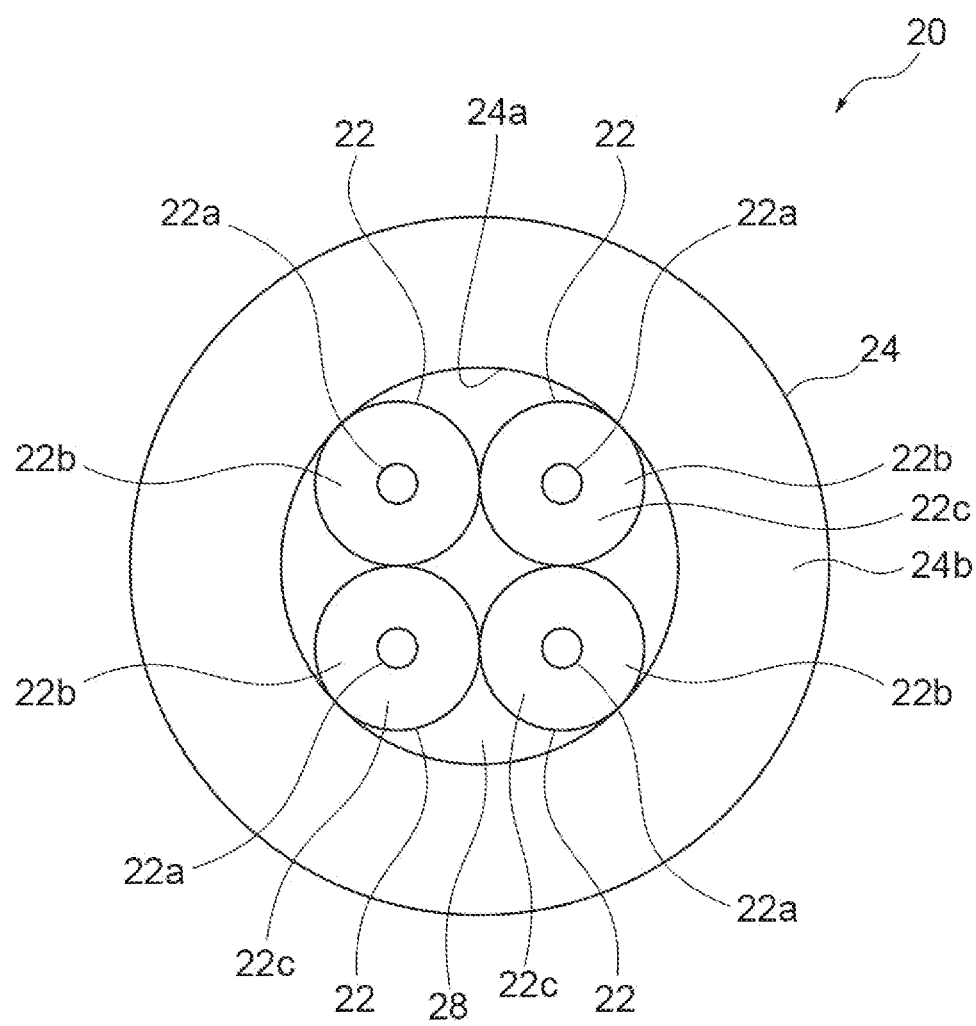
FIG. 6 is a diagram illustrating tips of optical fibers and an end surface of a ferrule.

Optical fibers 22 can be optically connected to MCF 12. As illustrated in FIGS. 3, 4, and 6, each of optical fiber 22 includes a core 22a that extends in longitudinal direction A, a cladding 22b that extends in longitudinal direction A and that surrounds core 22a, and a tip surface 22c. FIG. 6 is a diagram illustrating tips of optical fibers 22 and an end surface of ferrule 24. Tip surface 22c is formed of a tip of core 22a and a tip of cladding 22b. Core 22a may be made of silica glass in which a dopant such as germanium is added to increase a refractive-index. Cladding 22b may be made of silica glass in which a dopant such as fluorine is added to decrease a refractive-index. The combination of materials, dopants, and the like can be appropriately selected. Each core 22a of optical fibers 22 propagates an optical signal having a predetermined wavelength. Optical fibers 22 may be, for example, a bundled fiber or may be formed of non-bundled optical fibers.

In second optical connector 20, optical fibers 22 are arranged two dimensionally. Second optical connector 20 may include, for example, four optical fibers 22, as illustrated in FIG. 6, and may include seven optical fibers 22, eight optical fibers 22, or nineteen optical fibers 22. The number of optical fibers 22 is not limited thereto. The number and arrangement of optical fibers 22 in second optical connector 20 correspond to the number and arrangement of cores 12a in MCF 12 of first optical connector 10. In other words, the arrangement of optical fibers 22 are similar to or coincide with the arrangement of cores 12a in MCF 12. It is not necessary for the number and arrangement of optical fibers 22 to completely coincide with the number and arrangement of cores 12a in MCF 12. A configuration in which some of optical fibers are not optically connected may be employed. Optical fibers 22 of second optical connector 20 are configured to be optically connected to respective cores 12a of MCF 12 in first optical connector 10 by being rotationally adjusted around the center axis of ferrule 24.

A core diameter of each core 22a may be, for example, 10 μm or less, 5 μm or less, or 1 μm or more. A core pitch (center-to-center distance) of each core 22a may be, for example, 10 μm to 50 μm. A cladding diameter of each cladding 22b may be 80 μm to 125 μm on the outer side of ferrule 24 described below, and may be reduced so as to correspond to MCF 12 on the inner side of ferrule 24. A diameter of a circumscribed circle defined by thinned optical fibers 22, which corresponds to an inner diameter of an inner hole 24a of ferrule 24, corresponds to the cladding diameter of MCF 12, and may be, for example, 200 μm or less, 125 μm or less, 100 μm or less, 80 μm or less, or 50 μm or more. Inside ferrule 24, each cladding 22b may be converted from a typical outer diameter of 125 μm or 80 μm to a smaller diameter. Such an optical fiber can be realized by etching a tip part with hydrofluoric acid liquid or the like. In this case, inner hole 24a of ferrule 24 that houses optical fibers 22 may have different inner diameters for a part that houses optical fibers having a smaller diameter and a part that houses optical fibers having a typical outer diameter.

Ferrule 24 is a columnar member that collectively holds tip parts 22d of optical fibers 22, and has inner hole 24a which is a through hole that houses tip parts 22d of optical fibers 22, and an end surface 24b. Ferrule 24 fixes tip parts 22d of optical fibers 22 in inner hole 24a with a fiber-fixing adhesive 28 so that tip surfaces 22c of optical fibers 22 are exposed in the inner part of end surface 24b of ferrule 24. An inner diameter of inner hole 24a is equal to or slightly smaller than an outer diameter of a bundle of the plurality of optical fibers 22. Tip parts 22d of optical fibers 22 are inserted into inner hole 24a, and bonded and fixed by fiber-fixing adhesive 28 injected into a gap between inserted tip parts 22d and an inner wall of inner hole 24a. Fiber-fixing adhesive 28 is, for example, a thermosetting adhesive, and can be cured by heating fiber-fixing adhesive 28 after injecting fiber-fixing adhesive 28 into a predetermined place. Similarly to ferrule 14, ferrule 24 is, for example, 6 mm to 8 mm in length, and is made of a ceramic material such as zirconia.

As illustrated in FIG. 3, flange 26 is a cylindrical member that holds a rear end part of ferrule 24 and houses optical fibers 22 therein. Parts of optical fibers 22 housed in flange 26 may be fixed in flange 26 by an adhesive or the like. Flange 26 is made of, for example, a metal or a resin.

Figure 7:
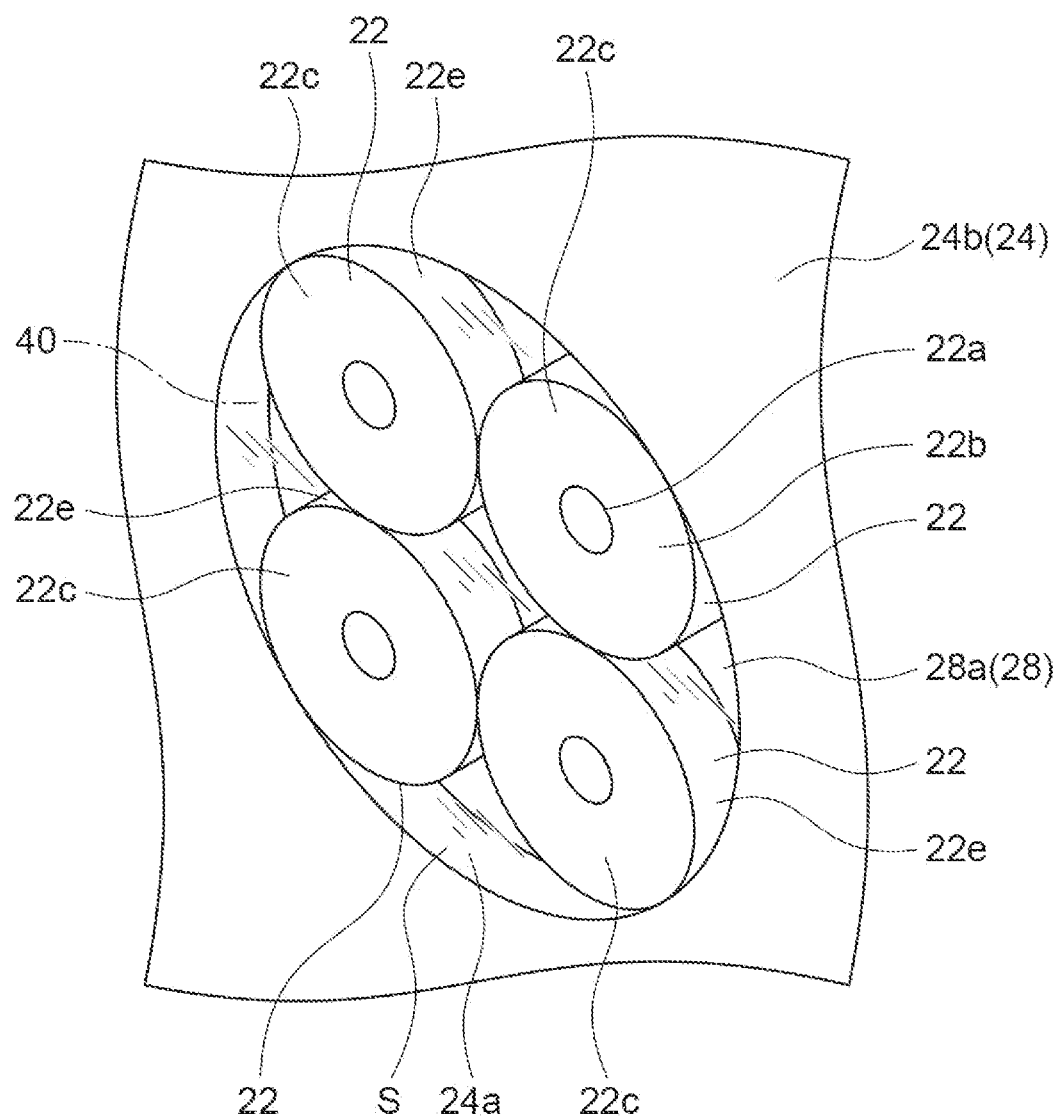
FIG. 7 is a perspective view illustrating an initial state in which optical fibers are fixed in a ferrule with a fiber-fixing adhesive with a tip surface of each fiber coinciding with an end surface of the ferrule.
Figure 8:
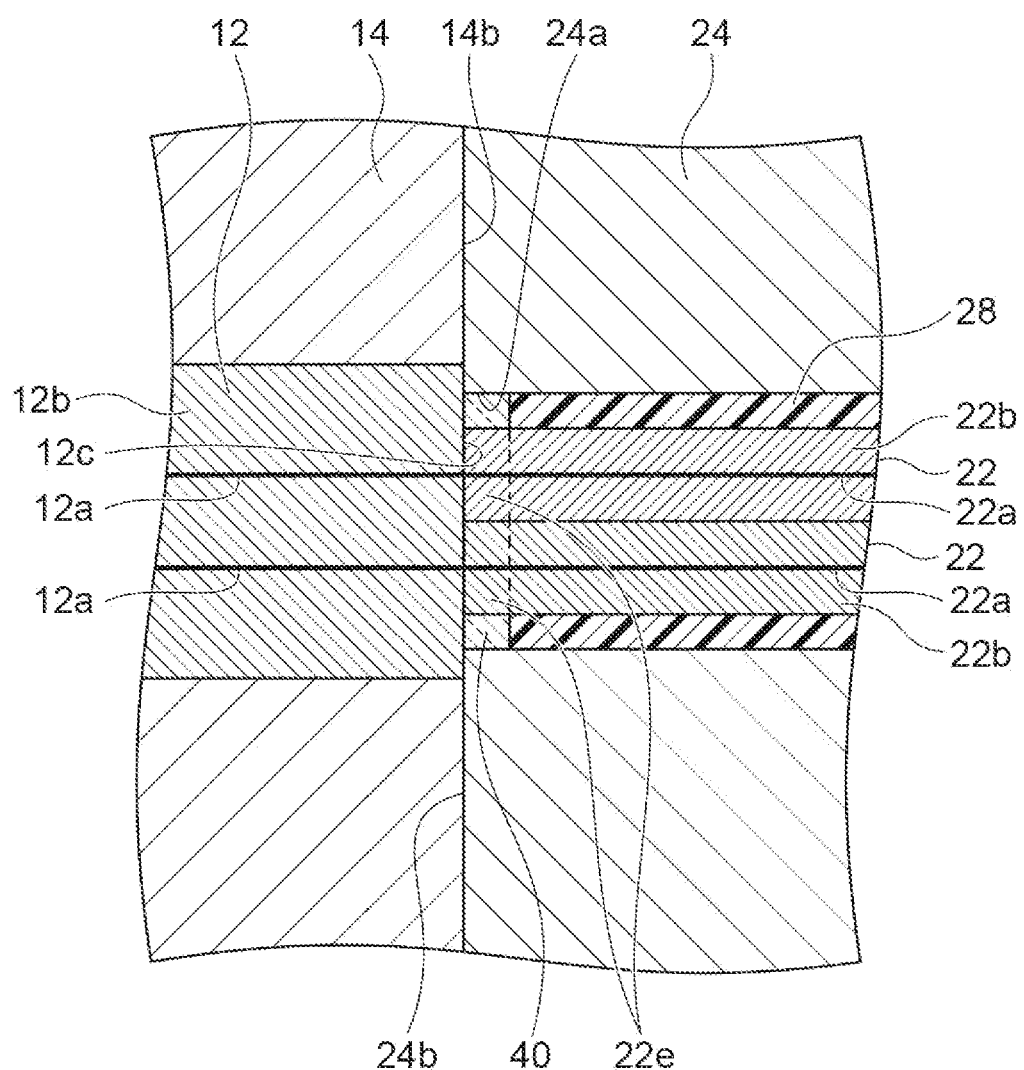
FIG. 8 is a cross-sectional view illustrating the initial state in FIG. 7.
Figure 9:
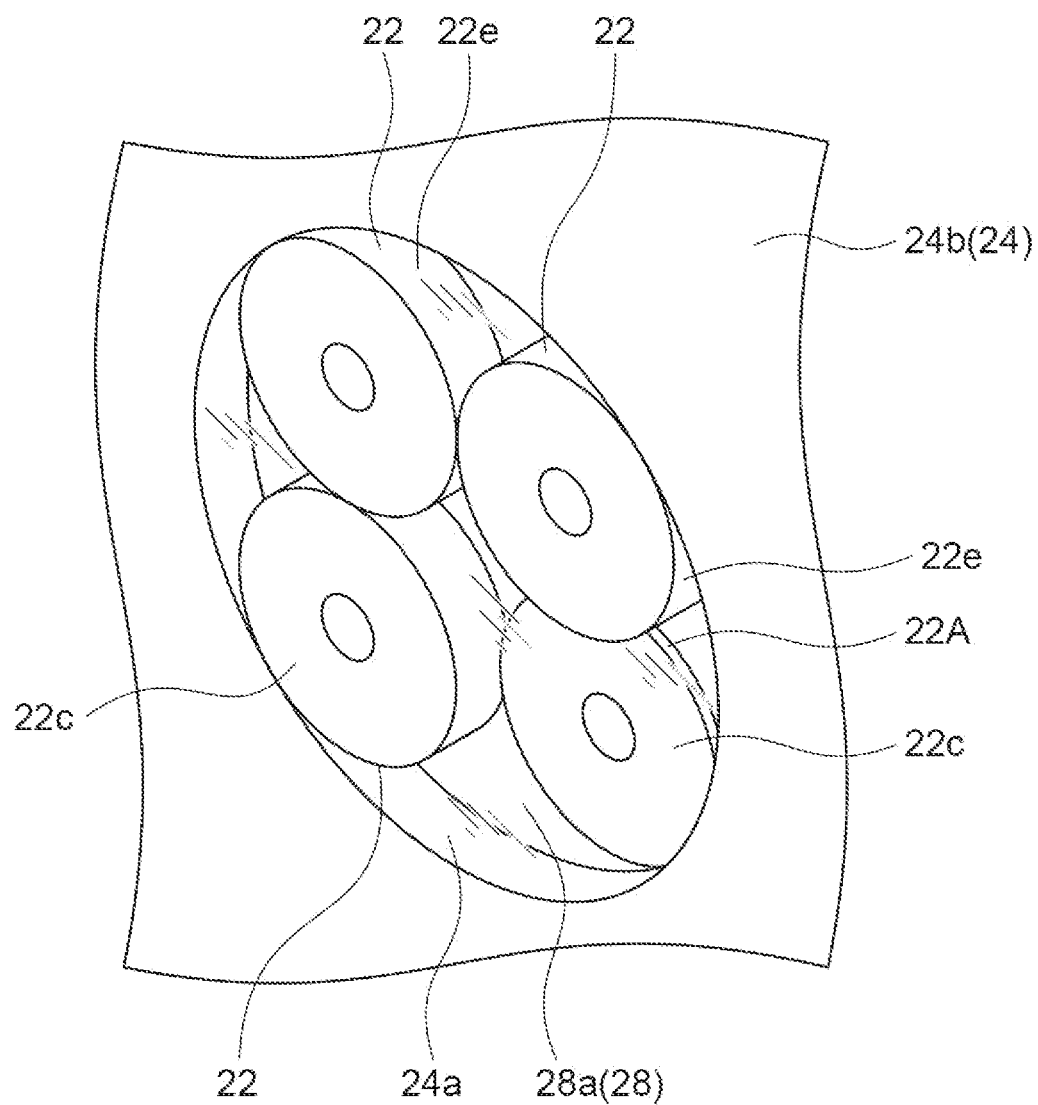
FIG. 9 is a perspective view illustrating a state in which one optical fiber is recessed inside from the initial state illustrated in FIGS. 7 and 8.
Figure 10:
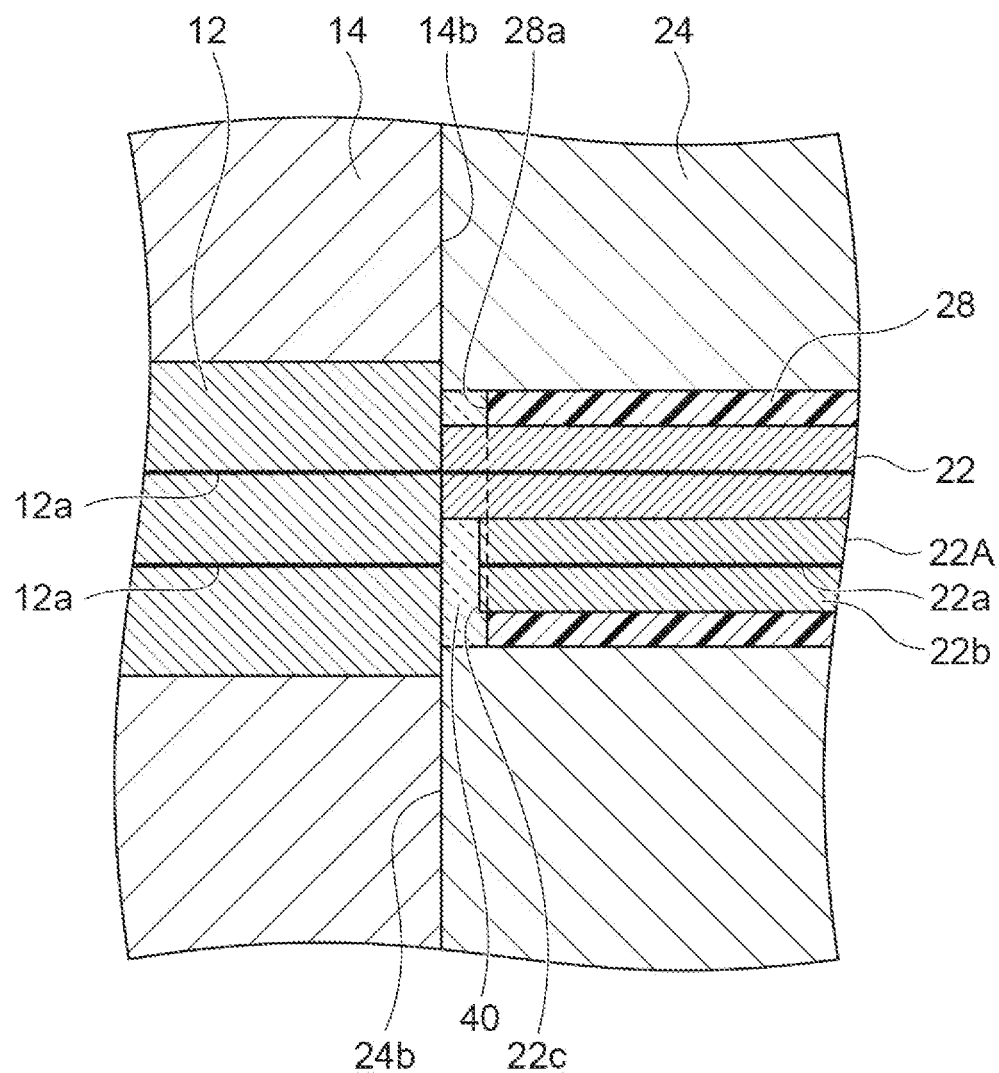
FIG. 10 is a cross-sectional view illustrating the recessed state shown in FIG. 9.

Here, the relationship among end surface 24b of ferrule 24, a tip exposure part 22e including tip surface 22c of each of the optical fiber 22, and a surface 28a of fiber-fixing adhesive 28 in second optical connector 20 of optical connection structure 1 will be described with reference to FIGS. 7 to 10. FIG. 7 is a perspective view illustrating an initial state in which optical fibers are fixed in a ferrule with a fiber-fixing adhesive, with a tip surface of each fiber coinciding with an end surface of the ferrule. FIG. 8 is a cross-sectional view illustrating the initial state of FIG. 7. FIG. 9 is a perspective view illustrating a state in which one of optical fibers are recessed inside from the initial state illustrated in FIGS. 7 and 8. FIG. 10 is a cross-sectional view illustrating the recessed state in FIG. 9.

As illustrated in FIGS. 7 and 8, fiber-fixing adhesive 28 is packed in inner hole 24a such that surface 28a is recessed from end surface 24b of ferrule 24 in inner hole 24a in second optical connector 20. Surface 28a of fiber-fixing adhesive 28 faces tip surface 12c of MCF 12. An amount of recession from a virtual plane along end surface 24b of ferrule 24 to surface 28a of fiber-fixing adhesive 28 in longitudinal direction A is not particularly limited. For example, a maximum amount of recession of the surface 28a may be equal to or greater than 0.1 μm and equal to or less than 5 μm. The maximum amount of the recession may be equal to or less than 3 μm. Surface 28a may be a flat surface as illustrated in FIG. 7, or may be an uneven surface. In a case of an uneven surface, the amount of recession may be the shortest distance from the virtual plane along end surface 24b of ferrule 24 to the most recessed region in surface 28a. Such a distance can be measured by a surface height measuring device using the principle of a white light interferometer, or a laser microscope, for example.

In second optical connector 20 according to the present embodiment, a refractive-index matching material 40 is injected into a space S formed by a recession of surface 28a of fiber-fixing adhesive 28. Space S is a region (gap) defined by tip surface 12c of MCF 12, inner hole 24a, the recessed surface 28a of fiber-fixing adhesive 28, and tip exposure part 22e including tip surface 22c of each of the optical fiber 22. Refractive-index matching material 40 has substantially the same refractive-index as cores 12a of MCF 12 and cores 22a of optical fibers 22, for example. A deviation amount of the refractive-index of refractive-index matching material 40 is within 3% with respect to refractive indices of cores 12a or refractive indices of cores 22a. Refractive-index matching material 40 is formed of a liquid transparent at wavelengths used for optical communications. Refractive-index matching material 40 may be, for example, silicone oil or the like which has a predetermined refractive-index and transmits light. Refractive index matching material 40 may be in a form of a gel, but can be in a form of an oil in consideration of immediate mobility of refractive index matching material 40. A viscosity of refractive-index matching material 40 is, for example, equal to or greater than 1 mPa·s and equal to or less than 10000 mPa·s. The viscosity of refractive-index matching material 40 may be equal to or less than 3000 mPa·s. Since space S is sealed by end surface 14b of ferrule 14 and end surface 24b of ferrule 24, fiber-fixing adhesive 28 injected into space S is sealed. In other words, fiber-fixing adhesive 28 is prevented from leaking out from a butting surface between ferrule 14 and ferrule 24.

Next, with reference to FIGS. 9 and 10, a description will be given of a case where, in optical connection structure 1 with the configuration described above, some of optical fibers 22 are recessed inward (rearward) in second optical connector 20 due to an influence of heat or the like. In FIGS. 9 and 10, one optical fiber 22A is recessed inward so that tip surface 22c of optical fiber 22A substantially coincides with or slightly protrudes from surface 28a of fiber-fixing adhesive 28.

In optical connection structure 1 according to the present embodiment, even when optical fiber 22A of optical fibers 22 is recessed inward as described above, refractive-index matching material 40 injected into space S enters between tip surface 22c of recessed optical fiber 22A and a corresponding core 12a of MCF 12 by a capillary action or the like. Therefore, optical communication between core 22a of optical fiber 22A and the corresponding core 12a of MCF 12 can be continued in the same state as the initial state. When refractive-index matching material 40 is oil-like, it is easier for refractive-index matching material 40 to move to a necessary place more quickly.

Figure 11:
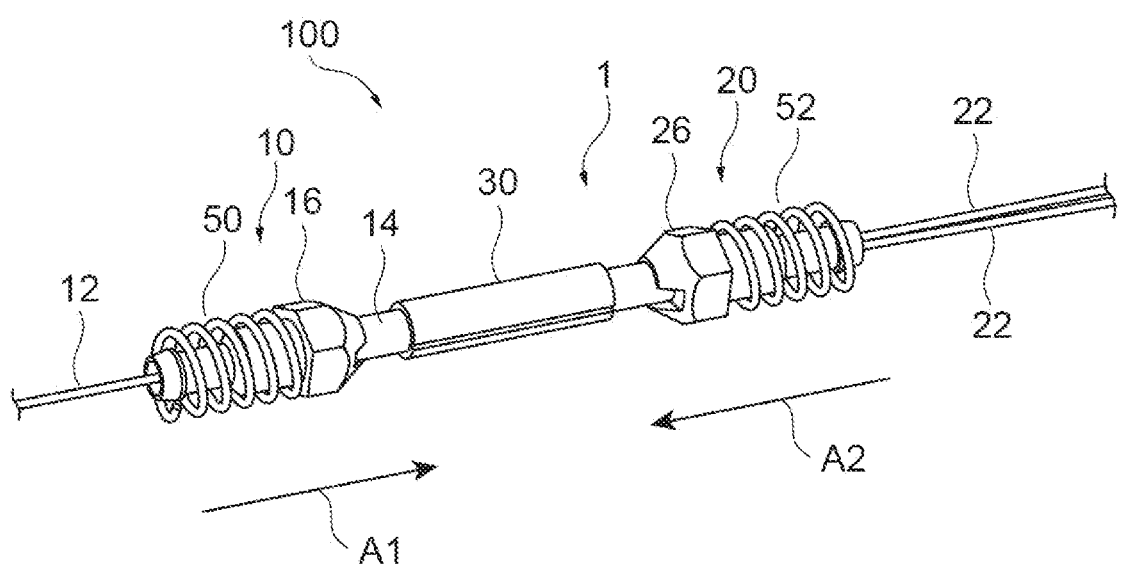
FIG. 11 is a perspective view illustrating a configuration to fix the optical connection structure illustrated in FIG. 1.
Figure 12:
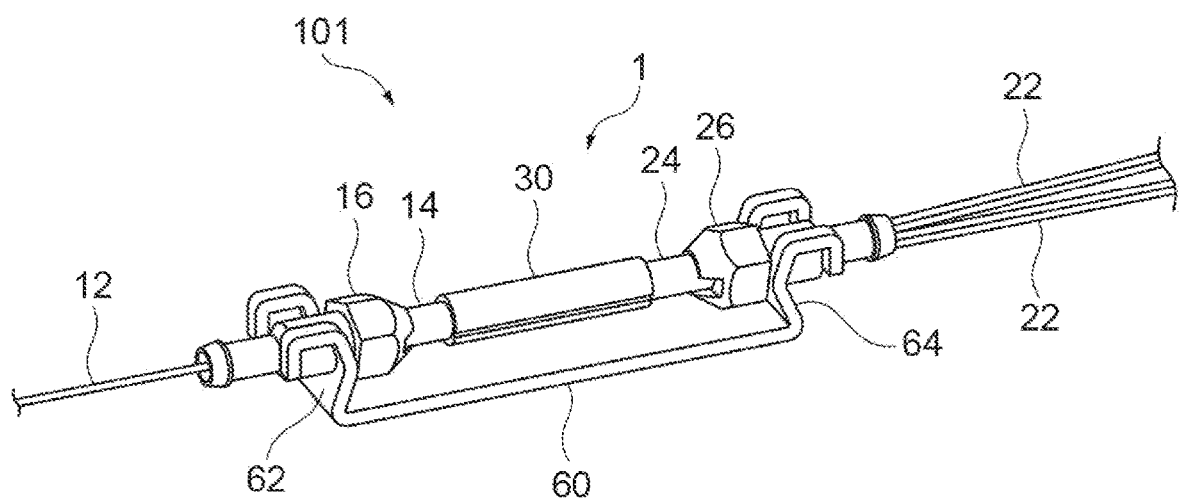
FIG. 12 is a perspective view illustrating another configuration to fix the optical connection structure illustrated in FIG. 1.
Figure 13:
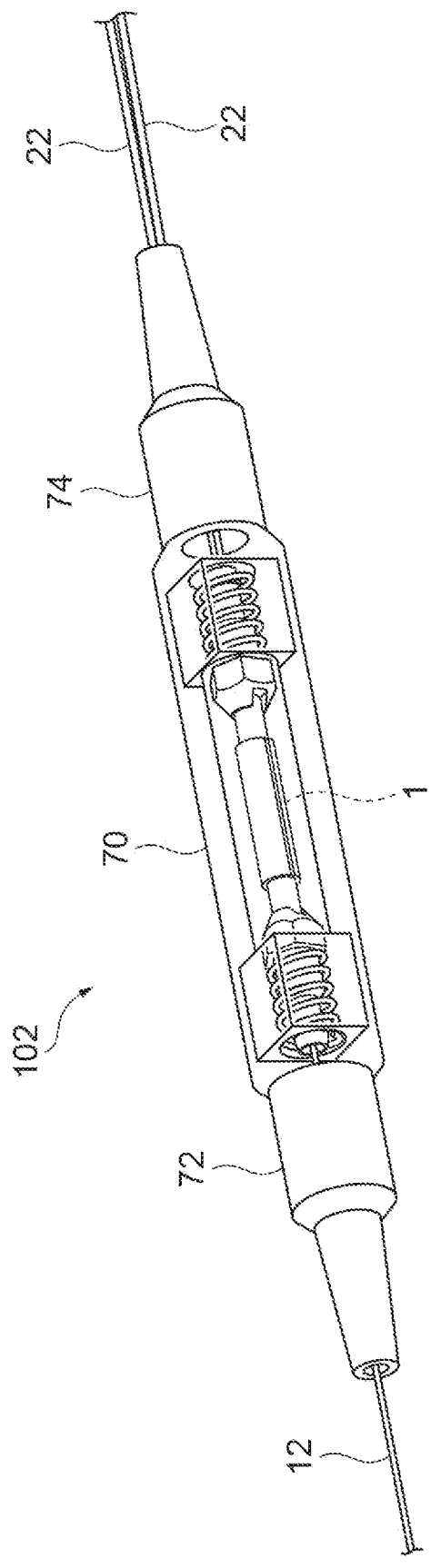
FIG. 13 is a perspective view illustrating still another configuration to fix the optical connection structure illustrated in FIG. 1.

Next, a holding configuration for maintaining a state in which ferrule 14 and ferrule 24 are butted against each other in optical connection structure 1 with the configuration describe above will be described with reference to FIGS. 11 to 13. FIG. 11 is a perspective view illustrating a configuration to fix the optical connection structure 1. FIG. 12 is a perspective view illustrating another configuration to fix the optical connection structure 1. FIG. 13 is a perspective view illustrating still another configuration to fix the optical connection structure 1. In optical connection structure 1, such a holding configuration maintains a state in which refractive-index matching material 40 described above does not leak out from the butting surface between ferrule 14 and ferrule 24.

In a configuration 100 illustrated in FIG. 11, a spring member 50 that presses flange 16 of first optical connector 10 inward along an arrow A1 and a spring member 52 that presses flange 26 of second optical connector 20 inward along an arrow A2 are provided. In FIG. 11, a holding configuration at a base end of each of the spring member 50 and 52 is not illustrated. In this configuration 100, spring members 50 and 52 press against each other, so that end surface 14b of ferrule 14 and end surface 24b of ferrule 24 are sealed. In this configuration, ferrule 14 and ferrule 24 may be bonded and fixed to each other in split sleeve 30 with an adhesive to maintain a state in which end surface 14b and end surface 24b are in close contact with each other. Further, ferrule 14 and ferrule 24 may be bonded and fixed to split sleeve 30 to maintain a state in which end surface 14b and end surface 24b are in close contact with each other. As described above, a state in which refractive-index matching material 40 injected into space S is applied is maintained in configuration 100.

In configuration 101 illustrated in FIG. 12, a plate spring member 60 is provided which presses flange 16 of first optical connector 10 and flange 26 of second optical connector 20 inward. Plate spring member 60 includes a supporting portion 62 that engages flange 16 and a supporting portion 64 that engages flange 26. In this configuration 101, end surface 14b of ferrule 14 and end surface 24b of ferrule 24 are sealed by being pressed by plate spring member 60. In this configuration, as described above, ferrule 14 and ferrule 24 may be bonded and fixed to each other to maintain a state in which end surface 14b and end surface 24b are in close contact with each other. As a result, a state in which refractive-index matching material 40 injected into space S is applied is maintained in the configuration 101.

In configuration 102 illustrated in FIG. 13, the configuration 101 illustrated in FIG. 11 may be further packaged with a sealing resin or the like to provide a sealing portion 70. According to this configuration 102, it is possible to more reliably maintain a state in which refractive-index matching material 40 injected into space S is applied. In configuration 102, a boot 72 that covers flange 16 and MCF 12, and a boot 74 that covers flange 26 and optical fibers 22 may be further provided. This allows MCF 12 and optical fibers 22 to suppress a movement along longitudinal direction A, or to be protected. Configuration 101 illustrated in FIG. 12 may be packaged with a sealing resin or the like as illustrated in FIG. 13.

Next, a method of manufacturing the optical connection structure 1 described above will be described. First, MCF 12, ferrule 14, flange 16, a plurality of optical fibers 22, ferrule 24, flange 26, fiber-fixing adhesive 28, split sleeve 30, and refractive-index matching material 40 are prepared. In MCF 12, cores 12a are arranged in a predetermined arrangement (for example, with four cores in a square arrangement). For example, a fiber having a cladding diameter of 125 μm and a core pitch of 40 μm is prepared. As ferrule 14 and ferrule 24, for example, ferrules for LC are prepared.

Subsequently, MCF 12 is inserted into an inner hole of flange 16 and inner hole 14a of ferrule 14, and tip part 12d of MCF 12 is fitted into inner hole 14a of ferrule 14. At this time, tip surface 12c of MCF 12 may be caused to coincide with end surface 14b of ferrule 14, or after fitting, end surface 14b of ferrule 14 or the like may be PC (Physical Contact)-polished so that tip surface 12c of MCF 12 coincides with end surface 14b of ferrule 14. In a case of PC-polishing, a radius of curvature of end surface 14b of ferrule 14 is, for example, 1 mm to 50 mm. In this way, first optical connector 10 is prepared.

Further, optical fibers 22 are collectively inserted into an inner hole of flange 26 and inner hole 24a of ferrule 24, and tip parts 22d of optical fibers 22 are disposed in inner hole 24a of ferrule 24. Each of the optical fiber 22 is an optical fiber in which tip part 22d is processed to have a small diameter so as to correspond to MCF 12, or an optical fiber (for example, an optical fiber having a tip cladding of 40 μm in diameter) which is drawn so as to have such a small diameter as a whole. Such optical fibers 22 are arranged, for example, two dimensionally in ferrule 24 so as to correspond to arrangement of MCF 12. At this time, optical fibers 22 are arranged such that claddings 22b are in contact with each other and are also in contact with an inner wall of inner hole 24a in ferrule 24. Then, fiber-fixing adhesive 28 is injected into a gap between the inner wall of inner hole 24a in ferrule 24 and optical fibers 22. At this time, fiber-fixing adhesive 28 is injected enough to cover tip surfaces 22c of optical fibers 22 and end surface 24b of ferrule 24. Thereafter, fiber-fixing adhesive 28 is thermally cured by, for example, heating. As a result, optical fibers 22 are fixed in ferrule 24. Then, end surface 24b of ferrule 24 is PC-polished together with tip surfaces 22c of optical fibers 22 so that tip surfaces 22c of optical fibers 22 coincide with end surface 24b of ferrule 24. By PC-polishing, adhesives on tip surface 22c and end surface 24b are removed, and tip surface 22c and end surface 24b are exposed. In the case of PC-polishing, a radius of curvature of end surface 24b of ferrule 24 is, for example, 1 mm to 50 mm, as described above. Thus, an initial form of second optical connector 20 is prepared.

Subsequently, when the PC polishing is completed, additional heat treatment is performed on second optical connector 20 in the initial form. The additional heat treatment may be performed at temperatures higher than a temperature at which fiber-fixing adhesive 28 is cured, and a heat treatment time may be longer than a thermal curing time of fiber-fixing adhesive 28. By such an additional heat treatment, contraction of fiber-fixing adhesive 28 is accelerated, and surface 28a of fiber-fixing adhesive 28 is recessed from end surface 24b of ferrule 24 into inner hole 24a. For example, surface 28a is caused to be recessed with a maximum amount of recession in a range of 0.5 μm to 5 μm, or in a range of 3 μm or less. As a result, surface 28a of fiber-fixing adhesive 28 is recessed from end surface 24b of ferrule 24 into inner hole 24a, and thus second optical connector 20 provided with space S on the tip side is prepared.

Subsequently, refractive-index matching material 40 is applied to end surface 24b of ferrule 24 including space S in second optical connector 20. Then, in split sleeve 30, first optical connector 10 and second optical connector 20 are connected so that end surface 14b of ferrule 14 and end surface 24b of ferrule 24 are butted against each other.

Subsequently, alignment is performed by rotating MCF 12 or the plurality of optical fibers 22 in split sleeve 30 such that each of the core 12a of MCF 12 and a corresponding core 22a of optical fibers 22 are optically connected to each other.

Subsequently, when the alignment of the fibers is completed, first optical connector 10 and second optical connector 20 are fixed in a state of being pressed against each other by a pressing member as shown in FIGS. 11 to 13. At this time, ferrule 14 and ferrule 24 may be caused to be in a state of being pressed by friction with split sleeve 30 without using a pressing member, or ferrule 14 and ferrule 24 may be bonded and fixed by an adhesive. As described above, optical connection structure 1, or configuration 100, configuration 101, and configuration 102 can be obtained.

As described above, optical connection structure 1 according to the present embodiment is configured such that surface 28a of fiber-fixing adhesive 28 packed in ferrule 24 that holds optical fibers 22 is recessed from end surface 24b of ferrule 24 into inner hole 24a. Refractive-index matching material 40 is applied in space S sealed by end surface 14b of ferrule 14 and end surface 24b of ferrule 24. According to this configuration, even when some of optical fibers 22 are recessed inside due to a thermal influence or the like on optical connection structure 1, refractive-index matching material 40 moves into the gap, and fills the gap. Therefore, optical connection structure 1 does not degrade back reflections and insertion losses between MCF 12 and the recessed optical fibers 22, even when there is a thermal influence or the like, and can suppress degradation of optical characteristics over time.

In this embodiment, a maximum amount of recession from end surface 24b of ferrule 24 to surface 28a of fiber-fixing adhesive 28 in longitudinal direction A may be 0.1 μm to 5 μm. According to this configuration, since space S in which refractive-index matching material 40 is applied is extremely small, even when some of optical fibers 22 are recessed due to a thermal influence, refractive-index matching material 40 immediately moves into the gap due to a capillary action, and fills the gap. Therefore, optical connection structure 1 can easily prevent degradation of back reflections and insertion losses between MCF 12 and the recessed optical fibers 22, and can easily suppress degradation of optical characteristics over time.

In this embodiment, refractive-index matching material 40 is applied in space S defined by tip surface 12c of MCF 12, inner hole 24a, surface 28a of fiber-fixing adhesive 28, and tip exposure part 22e including tip surface 22c of each of the optical fiber 22. According to this configuration, even when some of optical fibers 22 are recessed due to a thermal influence on optical connection structure 1, refractive-index matching material 40 disposed near the gap immediately moves into the gap, and fills the gap. Therefore, optical connection structure 1 can easily prevent degradation of back reflections and insertion losses between MCF 12 and the recessed optical fibers 22, and can easily suppress degradation of optical characteristics over time. A part of refractive-index matching material 40 is located between end surface 14b of ferrule 14 and end surface 24b of ferrule 24.

In this embodiment, refractive-index matching material 40 may have a refractive-index with which an amount of deviation is within 3% with respect to refractive indices of cores 12a or refractive indices of cores 22a. According to this configuration, it is possible to more reliably prevent degradation of back reflections and insertion losses between MCF 12 and the recessed optical fibers 22, and it is possible to more reliably suppress degradation of optical characteristics over time.

In the present embodiment, arrangement of cores 12a in a plane direction along tip surface 12c of MCF 12 may coincide with arrangement of each core 22a in a plane direction along tip surfaces 22c of optical fibers 22. According to this configuration, the optical connection between MCF 12 and optical fibers 22 can be further optimized. Each of the core 12a of MCF 12 and each core 22a of optical fibers 22 may be arranged so that all of them correspond to each other, or some of them may be arranged so as not to correspond to each other.

In the present embodiment, ferrule 14 and ferrule 24 may be pressed against each other by spring members 50 and 51 or plate spring member 60 to seal end surface 14b and end surface 24b to each other. According to this configuration, it is possible to more reliably maintain a state in which refractive-index matching material 40 is applied in space S defined by end surface 14b of ferrule 14 and end surface 24b of ferrule 24, with a simple configuration.

In the present embodiment, ferrule 14 and ferrule 24 may be bonded and fixed to each other to maintain a state in which end surface 14b and end surface 24b are in close contact with each other. According to this configuration, it is possible to maintain a state in which refractive-index matching material 40 is applied in space S defined by end surface 14b and end surface 24b, with a simple configuration, In the present embodiment, optical connection structure 1 further includes split sleeve 30 that holds ferrule 14 and ferrule 24 from an outer side such that optical axes of cores 12a and an optical axis of each core 22a are aligned with each other. Ferrule 14 and ferrule 24 may be bonded and fixed to split sleeve 30 to maintain a state in which end surface 14b and end surface 24b are in close contact with each other. According to this configuration, it is possible to maintain a state in which refractive-index matching material 40 is applied in space S defined by end surface 14b of ferrule 14 and end surface 24b of ferrule 24, with a simple configuration.

In the present embodiment, end surface 14b of ferrule 14 and end surface 24b of ferrule 24 may have, in at least a portion, a spherical shape having a radius of curvature of 1 mm to 50 mm According to this configuration, since the tips of ferrule 14 and ferrule 24 are easily brought into close contact with each other when ferrule 14 and ferrule 24 are butted against each other, it is possible to easily perform a direct bonding, for example, a physical contact (PC), between tip surface 12c of MCF 12 and tip surfaces 22c of optical fibers 22.

In addition, the method of manufacturing an optical connection structure according to the present embodiment includes a step of inserting each of the tip part 22d of the plurality of optical fibers 22 into inner hole 24a of ferrule 24 and fixing optical fibers 22 to ferrule 24 with fiber-fixing adhesive 28, a step of polishing an end surface of ferrule 24 to which the plurality of optical fibers 22 are fixed, and a step of performing, after the step of polishing, an additional heat treatment on a member including fiber-fixing adhesive 28. In this method of manufacturing an optical connection structure, the additional heat treatment causes surface 28a of fiber-fixing adhesive 28 to be recessed from end surface 24b of ferrule 24 into inner hole 24a. According to this manufacturing method, it is possible to easily form space S in which refractive-index matching material 40 to be injected between MCF 12 and optical fibers 22 is disposed.

Although the embodiments according to the present disclosure have been described in detail above, the present disclosure is not limited to the above-described embodiments and can be applied to various embodiments.

What is claimed is:

1. An optical connection structure comprising:
    a multi-core fiber including a plurality of first cores each extending in a longitudinal direction, a first cladding surrounding the plurality of first cores, and a first fiber tip surface including tips of the plurality of first cores and a tip of the first cladding;
    a first ferrule having a first inner hole and a first ferrule end surface, wherein the first inner hole houses a tip part of the multi-core fiber and the first fiber tip surface is exposed in the inner part of the first ferrule end surface, the first ferrule fixing the tip part of the multi-core fiber in the first inner hole;
    a plurality of optical fibers optically connected to the multi-core fiber, each of the optical fiber including a second core extending in the longitudinal direction, a second cladding surrounding the second core, and a second fiber tip surface including a tip of the second core and a tip of the second cladding; and
    a second ferrule having a second inner hole and a second ferrule end surface, wherein the second inner hole houses tip parts of the plurality of optical fibers and the second fiber tip surface of each of the plurality of optical fibers is exposed in the inner part of the second ferrule end surface, the second ferrule fixing the tip parts of the plurality of optical fibers in the second inner hole with an adhesive,
    wherein the adhesive is packed in the second inner hole such that a surface of the adhesive facing the first fiber tip surface is recessed from the second ferrule end surface into the second inner hole, and
    wherein a refractive-index matching material is applied in a space defined by the first ferrule end surface the second inner hole, the surface of the adhesive that is recessed from the second ferrule end surface into the second inner hole, and the second fiber tip surface that is exposed in the inner part of the second ferrule end surface.

2. The optical connection structure according to claim 1, wherein a maximum amount of recession from the second ferrule end surface to the surface of the adhesive in the longitudinal direction is equal to or greater than 0.1 μm.

3. The optical connection structure according to claim 1, wherein a maximum amount of recession from the second ferrule end surface to the surface of the adhesive in the longitudinal direction is equal to or less than 5 μm.

4. The optical connection structure according to claim 3, wherein the maximum amount of recession from the second ferrule end surface to the surface of the adhesive is equal to or less than 3 μm.

5. The optical connection structure according to claim 1, wherein the refractive-index matching material is applied in each space defined by the first ferrule end surface, the second inner hole, the recessed surface of the adhesive, and a tip exposure part including the second fiber tip surface of each of the plurality of optical fibers in the second ferrule.

6. The optical connection structure according to claim 1, wherein the refractive-index matching material has a refractive index with which an amount of deviation is within 3% with respect to a refractive index of the second core.

7. The optical connection structure according to claim 1, wherein the refractive-index matching material has a viscosity of being equal to or greater than 1 mPa·s and equal to or less than 10000 mPa·s.

8. The optical connection structure according to claim 7, wherein the refractive-index matching material has the viscosity of being equal to or less than 3000 mPa·s.

9. The optical connection structure according to claim 1, wherein the refractive-index matching material includes a liquid which is transparent with fiber transmission wavelength.

10. The optical connection structure according to claim 1, wherein arrangement of the plurality of first cores in a plane direction along the first fiber tip surface coincide with arrangement of each second core in a plane direction along the second fiber tip surface.

11. The optical connection structure according to claim 1, wherein the first ferrule and the second ferrule are pressed against each other by a pressing member to seal the first ferrule end surface and the second ferrule end surface to each other.

12. The optical connection structure according to claim 1, wherein the first ferrule and the second ferrule are bonded and fixed to each other to maintain a state in which the first ferrule end surface and the second ferrule end surface are in close contact with each other.

13. The optical connection structure according to claim 1, further comprising:
    a sleeve holding the first ferrule and the second ferrule from outside such that respective optical axes of the plurality of first cores and an optical axis of each second core are aligned with each other,
    wherein the first ferrule and the second ferrule are bonded and fixed to the sleeve to maintain a state in which the first ferrule end surface and the second ferrule end surface are in close contact with each other.

14. The optical connection structure according to claim 1, wherein the first ferrule end surface and the second ferrule end surface each have, in at least a portion, a spherical shape having a radius of curvature of equal to or greater than 1 mm and equal to or less than 50 mm.

15. A method of manufacturing the optical connection structure according to claim 1, comprising:
    inserting each of the tip parts of the plurality of optical fibers into the second inner hole of the second ferrule and fixing the plurality of optical fibers to the second ferrule by the adhesive;
    polishing, together with the second fiber tip surface, the second ferrule end surface of the second ferrule to which the plurality of optical fibers are fixed; and
    providing, after the polishing, a heat treatment on a member including the adhesive,
    wherein the heat treatment causes the surface of the adhesive to be recessed from the second ferrule end surface into the second inner hole.

* * * * *